(12) United States Patent
Okajima

(10) Patent No.: US 10,267,704 B2
(45) Date of Patent: Apr. 23, 2019

(54) OIL LEAKAGE DETECTION DEVICE

(71) Applicant: FANUC Corporation, Yamanashi (JP)

(72) Inventor: Yasushi Okajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/817,345

(22) Filed: Nov. 20, 2017

(65) Prior Publication Data

US 2018/0149551 A1 May 31, 2018

(30) Foreign Application Priority Data

Nov. 25, 2016 (JP) ................................. 2016-229258

(51) Int. Cl.
*B29C 49/80* (2006.01)
*G01M 3/28* (2006.01)
*G08B 21/18* (2006.01)
*G01M 3/02* (2006.01)

(52) U.S. Cl.
CPC .......... *G01M 3/2807* (2013.01); *G01M 3/025* (2013.01); *G08B 21/18* (2013.01)

(58) Field of Classification Search
CPC .......... B66B 19/06; B66B 7/10; B25J 18/025; B25J 5/007; B25J 9/0018; B60K 6/387; B60K 6/46; B60T 13/686; B60T 17/222; B60T 8/266; B60W 20/10; B60W 20/20; B60W 2510/02; B60W 2510/0638
USPC ....... 340/605, 606, 610, 611, 614, 616, 588, 340/589, 576, 679, 686.5, 825.23
See application file for complete search history.

(56) References Cited

U.S. PATENT DOCUMENTS 4,520,919 A * 6/1985 Keitaro ................ B23Q 1/0018
198/803.7
5,461,903 A 10/1995 Harms
(Continued)

FOREIGN PATENT DOCUMENTS

JP 2004-212128 A 7/2004
JP 2004-347013 A 12/2004
(Continued)

OTHER PUBLICATIONS

Notice of Allowance in JP Application No. 2016-229258, dated May 1, 2018, 6pp.

*Primary Examiner* — Daniel Previl
(74) *Attorney, Agent, or Firm* — Hauptman Ham, LLP

(57) ABSTRACT

In order to detect a point of generation of oil leakage in a machine, an oil leakage detection device is provided with a state observation unit configured to acquire a change pattern of the flow rate of oil from log data recorded during operation of a machine tool and create input data based on the acquired change pattern of the oil flow rate, a label acquisition unit configured to acquire information on the presence of generation of oil leakage and a point of generation of oil leakage from the log data and create teacher data based on the acquired information on the presence of generation of oil leakage and information on the generation point of oil leakage, a learning unit configured to perform supervised learning based on the input data and the teacher data, thereby constructing a learning model, and a learning model storage unit configured to store the learning model.

5 Claims, 8 Drawing Sheets

(56) References Cited

U.S. PATENT DOCUMENTS

| | | | | |
|---|---|---|---|---|
| 6,038,948 | A | * | 3/2000 | Link .................... B23B 31/302 |
| | | | | 279/114 |
| 6,357,280 | B1 | * | 3/2002 | Hu ........................ G01M 3/227 |
| | | | | 73/40 |
| 8,925,645 | B2 | * | 1/2015 | Harada ............... B25B 23/1405 |
| | | | | 173/2 |
| 2007/0028674 | A1 | | 2/2007 | Beiderman et al. |
| 2017/0220008 | A1 | | 8/2017 | Takahashi et al. |

FOREIGN PATENT DOCUMENTS

| | | |
|---|---|---|
| JP | 2017-33526 A | 2/2017 |
| JP | 2017-134786 A | 8/2017 |
| WO | 2017/065249 A1 | 4/2017 |

* cited by examiner

FIG.2

OIL FLOW RATE AT EACH DRIVE UNIT IN NORMAL STATE

OIL FLOW RATE AT EACH DRIVE UNIT IN ABNORMAL STATE

| POINT OF USE OF HYDRAULIC OIL | OPERATION | FLOW RATE (NORMAL) [l/min] | FLOW RATE (ABNORMAL APC) [l/min] | DIFFERENCE [l/min] |
|---|---|---|---|---|
| TABLE | CLAMPED | 1.2 | 1.1 | 0.1 |
|  | UNCLAMPED | 1.5 | 1.5 | 0 |
| PALLET | CLAMPED | 3.8 | 3.8 | 0 |
|  | UNCLAMPED | 2.0 | 2.1 | 0.1 |
| APC | RAISED | 9.1 | 8.5 | 0.6 |
|  | LOWERED | 11.7 | 12 | 0.3 |
| MAGAZINE | CLAMPED | 0.6 | 0.4 | 0.2 |
|  | UNCLAMPED | 0.6 | 0.4 | 0.2 |
| SPINDLE | CLAMPED | 2.5 | 2.3 | 0.2 |
|  | UNCLAMPED | 1.4 | 1.4 | 0 |
| TOTAL |  | 14.6 | 14.8 | 0.2 |

VALUE MEASURABLE BY SENSOR 12

(UNDERLINE INDICATES CURRENT STATE OF EACH DRIVE UNIT)

FIG.3

| POINT OF USE OF HYDRAULIC OIL | FLOW RATE CHANGE ACCOMPANYING CHANGE OF OPERATING CONDITIONS | | DIFFERENCE BETWEEN VALUES IN NORMAL AND ABNORMAL STATES |
|---|---|---|---|
| | IN NORMAL STATE | IN ABNORMAL APC STATE | |
| TABLE | 0.3 | 0.4 | 0.1 |
| PALLET | 1.8 | 1.7 | 0.1 |
| APC | 2.6 | 3.5 | 0.9 |
| MAGAZINE | 0 | 0 | 0 |
| SPINDLE | 1.1 | 0.9 | 0.2 |

FLOW RATE CHANGE IS GENERALLY LARGE AT OIL LEAKAGE POINT

THRESHOLD FOR DETERMINATION IS UNSTABLE DUE TO VARIOUS VARIATION FACTORS AND OIL LEAKAGE IS NOT ALWAYS GENERATED AT MAXIMUM-VALUE POINT

OIL LEAKAGE DETECTION DEVICE

RELATED APPLICATIONS

The present application claims priority to Japanese Application Number 2016-229258, filed Nov. 25, 2016, the disclosure of which is hereby incorporated by reference herein in its entirety.

BACKGROUND OF THE INVENTION

Field of the Invention

The present invention relates to an oil leakage detection device for detecting a point of generation of oil leakage in a machine using an information processing means.

Description of the Related Art

A machine tool is installed therein with a hydraulic pressure supply device for supplying oil to a plurality of drive units to clamp a spindle, table, and tool magazine or drive an APC (auto pallet changer). FIG. 9 is a view showing a schematic configuration of a hydraulic pressure supply device in a machine tool 1. (In FIG. 9, illustration of part of a cover or the like is omitted so that the interior of the machine tool 1 can be seen through the cover.) A hydraulic pressure supply device 2 of the machine tool 1 comprises a hydraulic unit 5 and hydraulic pipes 7 (represented by thick lines in FIG. 9; no numerals are given to denote some of the hydraulic pipes). The hydraulic unit 5 comprises a tank 3 configured to store oil and a pressure source 4 such as an oil-hydraulic pump. The hydraulic pipes 7 are distributed by distribution units 6 located in various parts of the machine tool 1 and connect the hydraulic unit 5 and various drive units of the machine tool 1, including a spindle 9, table 10, tool magazine (not shown), APC 11, and the like. The hydraulic pressure supply device 2 adjusts a pressure to be applied to the oil supplied from the pressure source 4 of the hydraulic unit 5 to the hydraulic pipes 7 and controls selector valves (not shown) or the like provided at various parts, thereby controlling the pressure of the oil supplied to the drive units of the machine tool 1.

While a hydraulic pressure is always applied to the hydraulic pipes 7, distribution units 6, and the like during operation, in the hydraulic pressure supply device 2 constructed in this manner, oil leakage may sometimes be generated at junctions 8 (represented by black spots in FIG. 9; no numerals are given to denote some of the junctions) between the individual hydraulic pipes 7, between the hydraulic pipes 7 and the distribution units 6, and between the hydraulic pipes 7 and the drive units. If the oil leakage is generated, a sufficient hydraulic pressure cannot be applied to the drive units, thus resulting in a malfunction or failure of the drive units, so that a manager of the machine tool 1 must regularly check the presence of oil leakage. For example, a technique disclosed in Japanese Patent Application Laid-Open No. 2004-347013 is known as a conventional technique for detecting oil leakage in the hydraulic pressure supply device 2.

Conventionally, if the generation of oil leakage is detected, it is necessary to stop the machine and make an investigation tracing a hydraulic path (ranging from the hydraulic unit 5 to drive units and including the hydraulic pipes 7, distribution units 6, and junctions 8). If there are a large number of drive units as supply destinations, however, the investigation of oil leakage that requires orderly tracing of the hydraulic pipes 7, which are intricately stretched around in the machine tool 1, imposes a heavy burden on the manager.

Possibly, this problem may be solved by detecting the oil flow rate by means of sensors, such as flowmeters, attached to various parts of the hydraulic path and identifying the place of generation of oil leakage based on a change of the detected flow rate. In this case, however, there arises a problem that if the sensors are attached to all possible parts of the hydraulic path, troubles due to management (failure handling/adjustment) of the sensors increase, rather resulting in an increase in running cost.

SUMMARY OF THE INVENTION

Accordingly, the object of the present invention is to provide an oil leakage detection device for detecting a point of generation of oil leakage in a machine.

As described above, it is not realistic to attach sensors for flow rate monitoring to all possible parts of a hydraulic path, due to a probable increase in cost. In the present invention, a sensor for detecting the flow rate is attached to a proximal part of the hydraulic path and used to acquire, as a change pattern, a change of the flow rate of oil caused when drive units of a machine tool are activated. The acquired change pattern is compared with a change pattern in a normal state (free from oil leakage), and a point of generation of oil leakage is identified based on the result of the comparison. A change pattern at the time of the oil leakage generation cannot be determined by a simple method, since it is affected by errors due to the respective connection states of various parts of the hydraulic path, disturbances such as loads on the drive units, and the like. According to the present invention, therefore, the change pattern at the time of the oil leakage generation is learned by machine learning so that the point of oil leakage generation can be identified by using the result of the learning.

An embodiment of an oil leakage detection device according to the present invention is configured to detect generation of oil leakage in a hydraulic pressure supply device for supplying oil to activate at least one drive unit of a machine tool, and comprises a state observation unit configured to acquire, as a change pattern, information on a change of the flow rate of oil supplied by the hydraulic pressure supply device corresponding to operating conditions of the drive unit, among log data recorded during operation of the machine tool, and create input data based on the acquired change pattern, a label acquisition unit configured to acquire information on the presence of generation of oil leakage in the oil leakage detection device and information on a point of generation of oil leakage in the oil leakage detection device, among the log data recorded during the operation of the machine tool, and create teacher data based on the acquired information on the presence of generation of oil leakage and information on the generation point of oil leakage in the oil leakage detection device, a learning unit configured to perform supervised learning based on the input data created by the state observation unit and the teacher data created by the label acquisition unit, thereby constructing a learning model, and a learning model storage unit configured to store the learning model.

Another embodiment of the oil leakage detection device of the present invention is configured to detect generation of oil leakage in a hydraulic pressure supply device for supplying oil to activate at least one drive unit of a machine tool, and comprises a learning model storage unit configured to store a learning model constructed by supervised learning using input data based on a change pattern indicative of information on a change of the flow rate of oil supplied by the hydraulic pressure supply device corresponding to operating conditions of the drive unit and teacher data based on information on the presence of generation of oil leakage in the oil leakage detection device and information on a point of generation of oil leakage in the oil leakage detection device, a state observation unit configured to create input data based on the change pattern indicative of the information on the change of the flow rate of oil supplied by the hydraulic pressure supply device corresponding to the operating conditions of the drive unit during operation of the machine tool, and a detection unit configured to detect the presence of generation of oil leakage in the oil leakage detection device and the generation point of oil leakage in the oil leakage detection device from the input data created by the state observation unit by using the learning model.

Another embodiment of the oil leakage detection device of the present invention is characterized by comprising an alarm unit configured to output an alarm based on the result of detection of the presence of generation of oil leakage in the oil leakage detection device and the generation point of oil leakage in the oil leakage detection device.

According to the present invention, a point of generation of oil leakage can be automatically identified by only attaching a sensor to a proximal part of a hydraulic path, so that generation of oil leakage, if any, can be immediately overcome and the running cost of a machine tool can be reduced.

BRIEF DESCRIPTION OF THE DRAWINGS

The above and other objects and features of the present invention will be obvious from the ensuing description of embodiments with reference to the accompanying drawings, in which:

FIG. 2 is a diagram showing the relationship between the oil flow rate and operating conditions of various drive units of a machine tool;

FIG. 3 is a diagram showing examples of change patterns of the oil flow rate detected when the operating conditions of the drive units in the normal and abnormal states are changed;

DETAILED DESCRIPTION OF THE PREFERRED EMBODIMENTS

Figure 1:
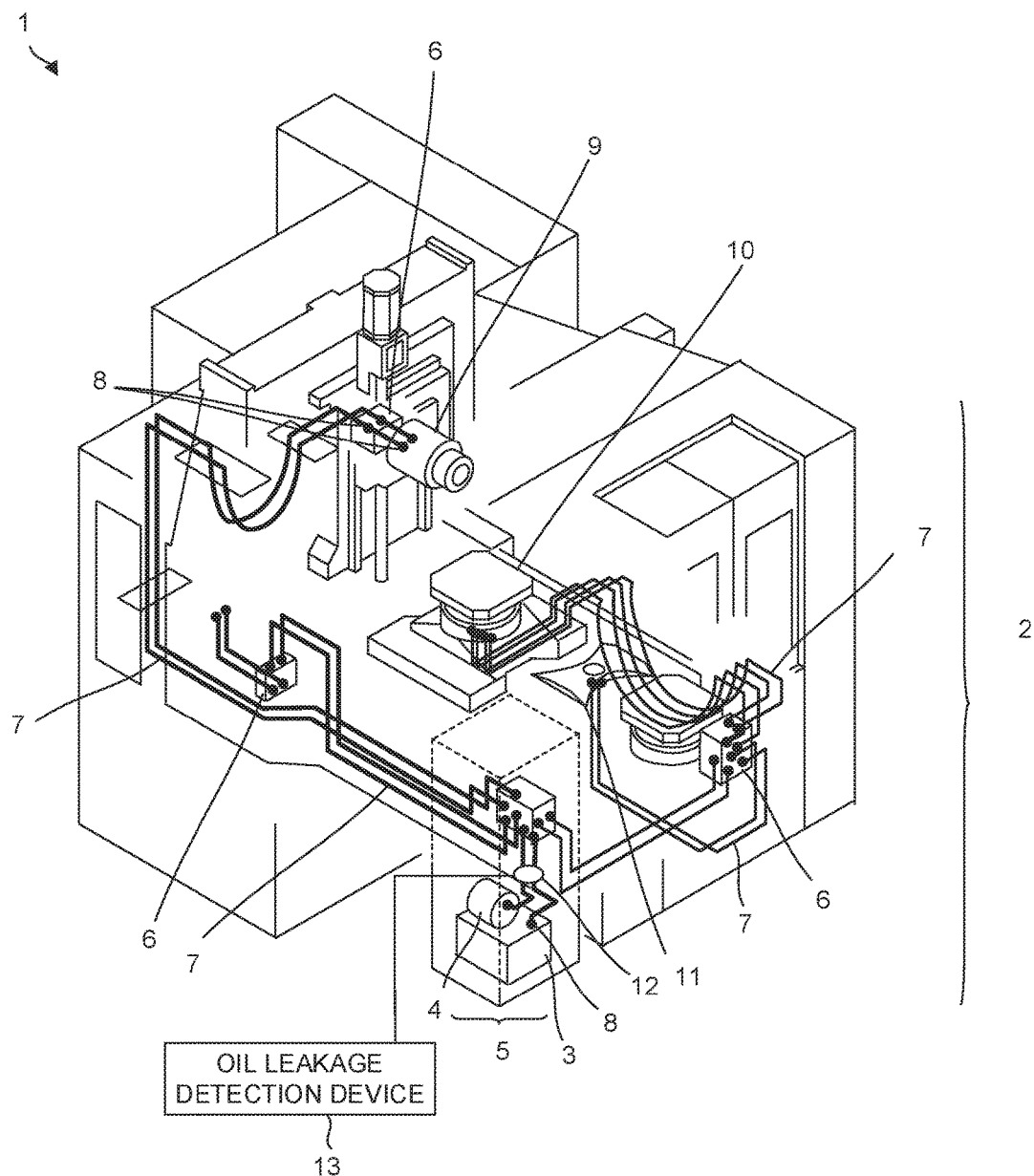
FIG. 1 is a view showing a schematic configuration of an oil leakage detection device with a sensor for detecting the flow rate of oil.

Embodiments of the present invention will now be described with reference to the accompanying drawings.

First, an outline of oil leakage location processing performed by an oil leakage detection device of one embodiment according to the present invention will be described with reference to FIGS. 1 to 3. An oil leakage detection device 13 of the present embodiment is configured to acquire the flow rate of oil detected by a sensor 12 that is attached to a proximal part of a hydraulic path of a hydraulic pressure supply device 2. The oil leakage detection device 13 of the present embodiment acquires changes in the oil flow rate detected by the sensor 12 when various drive units of a machine tool 1 are activated, in checking oil leakage in the hydraulic pressure supply device 2, and stores a combination of the oil flow rate changes during the activation of the individual drive units as one change pattern.

FIG. 2 is a diagram exemplifying oil flow rates used in the individual drive units of the machine tool 1 in a normal state and oil flow rates used in the individual drive units of the machine tool 1 in an abnormal APC state. In the example shown in FIG. 2, oil of 1.5 l/min is used if a table 10 is unclamped when the machine tool 1 is in the normal state, and oil of 8.5 l/min is used if an APC 11 of the machine tool 1 is raised when it is in the abnormal state. In this case, if the table 10, a pallet, a tool magazine, and a spindle are unclamped and if the APC is raised when the machine tool 1 is in the normal state, the sum of the flow rates of the oil used in the individual drive units is "1.5+2.0+9.1+0.6+1.4=14.6" l/min, and this value is detected by the sensor 12. Moreover, if the table 10, pallet, and tool magazine are unclamped, the APC of the machine tool 1 is raised, and the spindle is clamped when the APC is in the abnormal state, the sum of the flow rates of the oil used in the individual drive units is "1.5+2.1+8.5+0.4+2.3=14.8" l/min, and this value is detected by the sensor 12.

FIG. 3 is a diagram showing examples of change patterns of the oil flow rate detected by the sensor 12 when the operating conditions of the drive units in the normal and abnormal states are changed. In general, if oil leakage is generated in the machine tool 1, as shown in FIG. 3, changes in the oil flow rates caused when the drive units near the point of generation of the oil leakage are activated are liable to involve a great difference between values in the normal and abnormal states. When the machine tool 1 is actually operated, however, it cannot be uniformly determined that the oil leakage is caused at the point where the changes in the oil flow rates are subject to the great difference between values in the normal and abnormal states, since it is affected by errors due to the respective connection states of various parts of the hydraulic path and disturbances such as loads on the drive units. Moreover, thresholds cannot be uniformly settled for the decision on the generation of the oil leakage, either. Therefore, in the oil leakage detection device of the present embodiment, a machine learner is introduced to locate the oil leakage point. Supervised learning is performed based on input data and teacher data. The input data indicates a difference in the change pattern, which represents the flow rate changes responsive to changes in the operating conditions of the drive units shown in FIG. 3, between the normal and normal states. The teacher data indicates whether or not oil leakage is actually generated and a point of generation of oil leakage, if any. The oil leakage point in the running machine tool is identified based on the result of the supervised learning.

Figure 4:
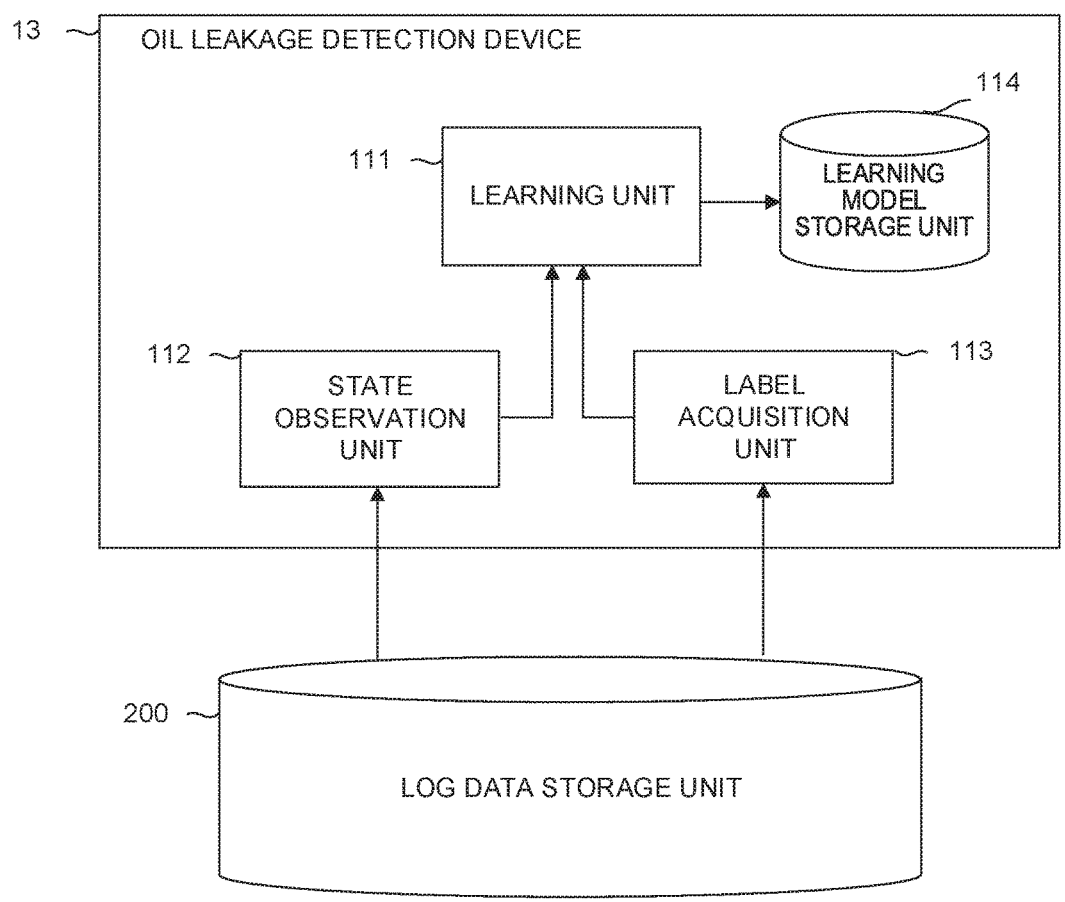
FIG. 4 is a schematic functional block diagram of the oil leakage detection device according to the one embodiment of the present invention at the time of learning.

FIG. 4 is a schematic functional block diagram of the oil leakage detection device according to the one embodiment of the present invention at the time of learning. The oil leakage detection device 13 of the present embodiment performs machine learning based on log data collected from at least one machine tool 1 and stored in a log data storage unit 200.

The log data storage unit 200 is recorded, as log data, with the operating conditions of the individual drive units, including a spindle 9, the table 10, the tool magazine, and the APC 11, established when the machine tool 1 illustrated in FIG. 1 is running, a detected value of the oil flow rate at the proximal part of the hydraulic pressure supply device 2 detected by the sensor 12, and maintenance information (including the presence of the generation of oil leakage and information on the point of generation of oil leakage, if any) indicative of the result of inspection of the hydraulic pressure supply device 2 input from an input device (not shown) of the machine tool 1 and recorded by a manager at the time of inspection. The log data storage unit 200 may be constructed as a conventional database.

In the machine tool 1, its drive units are controlled to machine a workpiece, and log data on the operation of the machine tool 1 are created in response to signals obtained from the various parts, based on the states of the drive units, detected values of the sensor 12, and the like, and are stored in a non-volatile memory (not shown) of the machine tool 1. The log data are created so that time series can be ascertained for the operating conditions of the drive units, the detected values of the oil flow rate detected by the sensor 12, and the like. Moreover, the log data include various pieces of information (the presence of generation of oil leakage, generation point of oil leakage, etc.) input through a machine control panel (not shown) by the manager who operates the machine tool 1 or a maintenance personnel who deals with the occurrence of abnormality, if any, in the machine tool 1. The log data thus stored in the non-volatile memory (not shown) of the machine tool 1 are collected into the log data storage unit 200 through the network or an external storage device or the like carried by an operator such as the maintenance personnel of the machine tool. This collection may be performed either every time the log data are created or regularly at appropriate intervals.

An outline of the learning performed by the oil leakage detection device 13 will now be described before describing various configurations of the oil leakage detection device 13.

Figure 5:
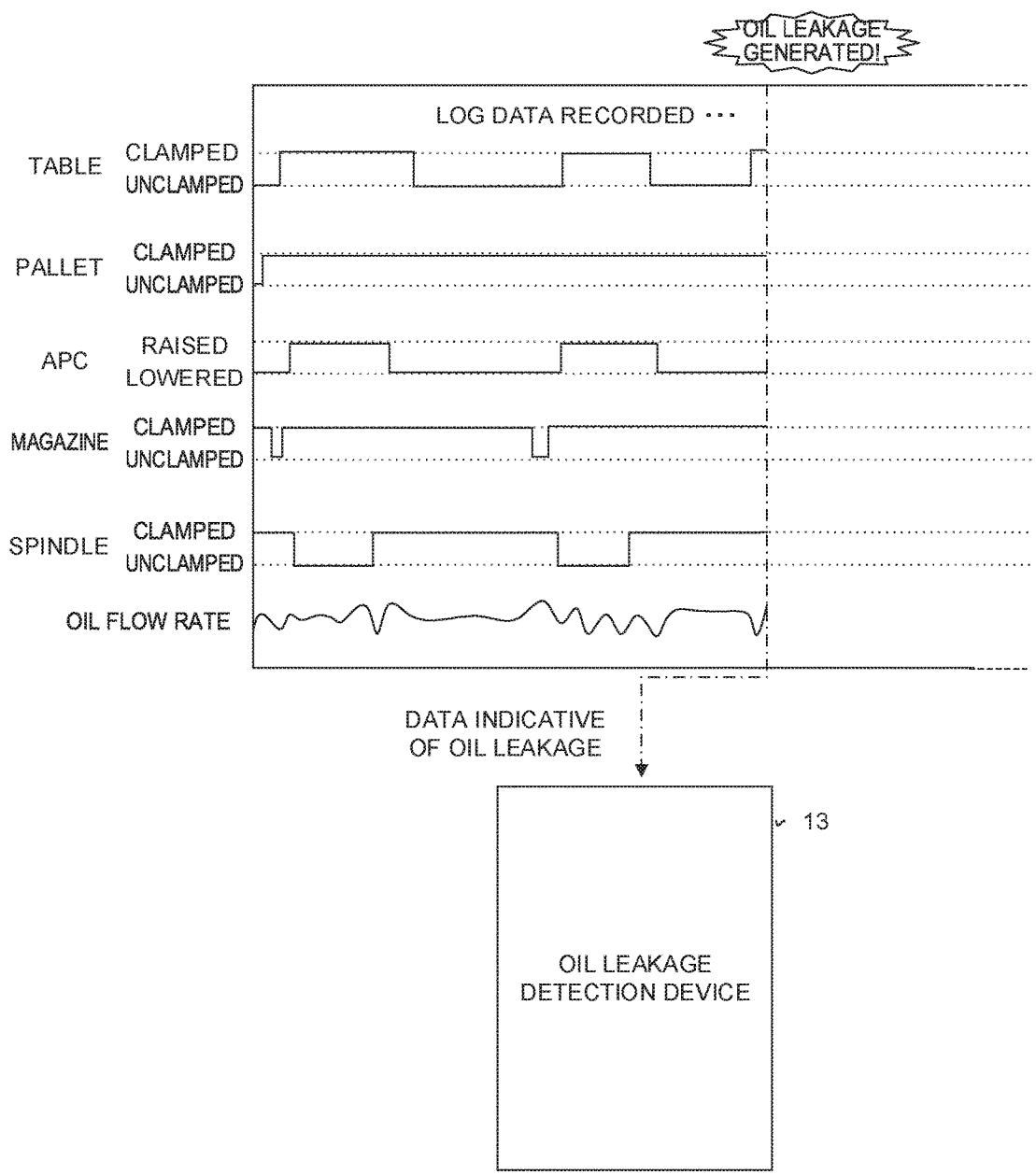
FIG. 5 is a diagram (1) illustrating a method of acquiring input data used for the learning by the oil leakage detection device according to the one embodiment of the present invention.
Figure 6:
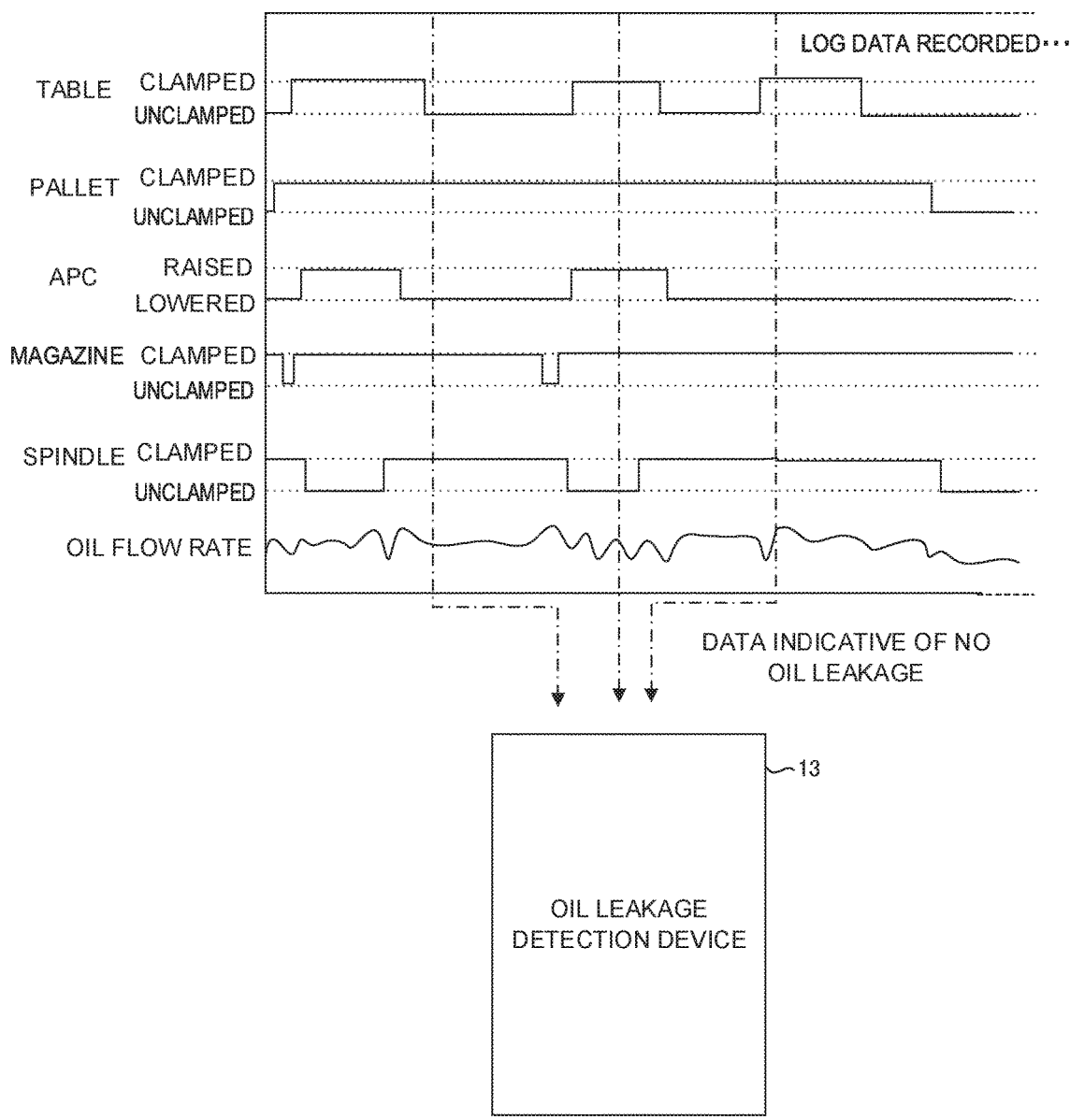
FIG. 6 is a diagram (2) illustrating a method of acquiring input data used for the learning by the oil leakage detection device according to the one embodiment of the present invention.

FIGS. 5 and 6 are diagrams illustrating the outline of the learning performed by the oil leakage detection device 13. The oil leakage detection device 13 of the present embodiment creates "input data and teacher data for the case where oil leakage is generated during operation" and "input data and teacher data for the case where oil leakage is not generated during operation", among the log data stored in the log data storage unit 200, and performs machine learning using the created data. Preferably, the learning by the oil leakage detection device 13 should be performed by using large amounts of data that are created based on large amounts of log data. The learning by the oil leakage detection device 13 need not always be performed all at once and may be performed in a plurality of times or every time the log data are collected. Moreover, a "reference change pattern of the oil flow rate in the normal state" used for the learning and detection should just be previously created by experimentally operating the machine tool 1 that is free from the generation of oil leakage so that the created change pattern can be used as the "reference change pattern of the oil flow rate in the normal state".

The "input data and teacher data for the case where oil leakage is generated during operation" are created based on the log data obtained before and after the point in time when the generation of oil leakage is detected by the manager or maintenance personnel of the machine tool, among the log data stored in the log data storage unit 200. If the generation of oil leakage is detected during the operation of the machine tool 1, for example, information such as "oil leakage generated: APC" is input through the machine control panel (not shown) of the machine tool 1 by the manager or maintenance personnel of the machine tool and recorded together with time information into the log data. In this case, the "input data for the case where oil leakage is generated during operation" is created based on the log data obtained before the point in time when the "oil leakage generated: APC" is input. The input data used for the machine learning by the oil leakage detection device 13 of the present embodiment is data indicative of a difference between the reference change pattern of the oil flow rate in the normal state and the change pattern of the oil flow rate obtained when oil leakage is generated. This data should just be created based on the change pattern of the oil flow rate in the abnormal state, which is created by combining the values of oil flow rate changes detected by the sensor 12 when the immediate past drive units are activated since the point in time when the generation of oil leakage is detected, and a change pattern of the oil flow rate in the normal state as a predetermined reference. In the case of this example, the "teacher data for the case where oil leakage is generated during operation" is the "oil leakage generated: APC".

On the other hand, the "input data and teacher data for the case where oil leakage is not generated during operation" are created based on the log data obtained before and after the point in time when oil leakage is not generated, among the log data stored in the log data storage unit 200. For example, the "input data for the case where oil leakage is not generated during operation" sampled at random or at predetermined time intervals should just be used, among the log data obtained when the operation of the machine tool 1 is safely finished without the detection of the generation of oil leakage during the operation. The input data used for the machine learning by the oil leakage detection device 13 of the present embodiment is data indicative of a difference between the reference change pattern of the oil flow rate in the normal state and the change pattern of the oil flow rate obtained at the time of sampling. This data should just be created based on the change pattern of the oil flow rate in the normal state, which is created by combining the values of oil flow rate changes detected by the sensor 12 when the immediate past drive units are activated since the time of sampling, and a change pattern of the oil flow rate in the normal state as a predetermined reference. (It is to be noted that the sampled change pattern of the oil flow rate in the normal state is not always coincident with the reference change pattern of the oil flow rate in the normal state, due to various variation factors such as disturbances.) In the case of this example, the "teacher data for the case where oil leakage is not generated during operation" is "no oil leakage".

The following is a description of the various configurations of the oil leakage detection device 13. The oil leakage detection device 13 comprises a learning unit 111, state observation unit 112, label acquisition unit 113, and learning model storage unit 114.

The learning unit 111 is a function means that performs the supervised learning based on input data acquired by the state observation unit 112 and teacher data (also called a label) acquired by the label acquisition unit 113 and constructs and stores a learning model into the learning model storage unit 114. The learning model constructed by the learning unit 111 is used to detect the generation of oil leakage, as described later. The learning model constructed by the learning unit 111 may be any model that can detect the generation of oil leakage from the input data described with reference to FIGS. 3, 5, 6, etc. A multi-layer neural network, such as that shown in FIG. 7, or Bayesian network, for example, can be used for this purpose. A description of the details of a conventional neural network, deep learning, and the like is omitted herein.

The state observation unit 112 creates the input data among the log data stored in the log data storage unit 200 and outputs the created input data to the learning unit 111. In the oil leakage detection device 13 of the present embodiment, the input data are difference values between the change patterns of the oil flow rates and are represented by numeric columns. Therefore, the state observation unit 112 can use these numeric columns directly as input data for the learning unit 111. If the data used as the input data are represented by character strings or any information other than numerical values, the state observation unit 112 may previously store a memory (not shown) with a conversion table for conversion of the character strings to numerical values so that information other than numerical values can be quantified and included in the input data by using the conversion table.

Figure 7:
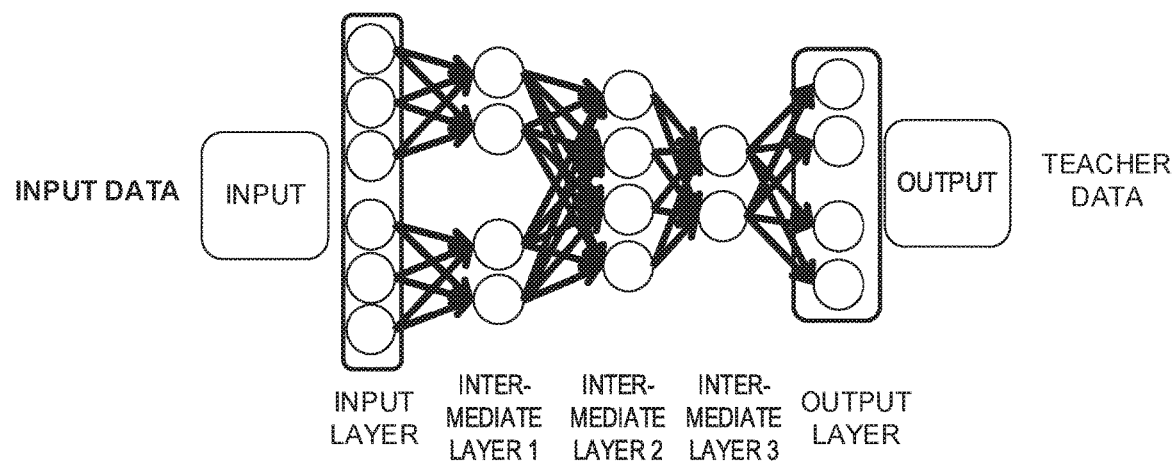
FIG. 7 is a diagram showing an example in which a multi-layer neural network is used as a learning model.

The label acquisition unit 113 creates teacher data (the presence of generation of oil leakage and generation point of oil leakage) corresponding to the input data created by the state observation unit 112 in synchronism with this creation, based on the log data stored in the log data storage unit 200, and outputs the created teacher data to the learning unit 111. If the multi-layer neural network shown in FIG. 7 is used as the learning model, for example, the respective signals of output layers should just be made to correspond to "no oil leakage", "oil leakage: table", "oil leakage: pallet", "oil leakage: APC", . . . and the teacher data be set so that any of the signals becomes "1" corresponding to the teacher data.

With the configurations described above, the oil leakage detection device 13 can promote learning of the state of oil leakage relative to the operating conditions of the individual drive units during the operation of the machine tool 1, thereby constructing the learning model.

The following is a description of the oil leakage detection device 13 for detecting the generation of oil leakage by using the constructed learning model.

Figure 8:
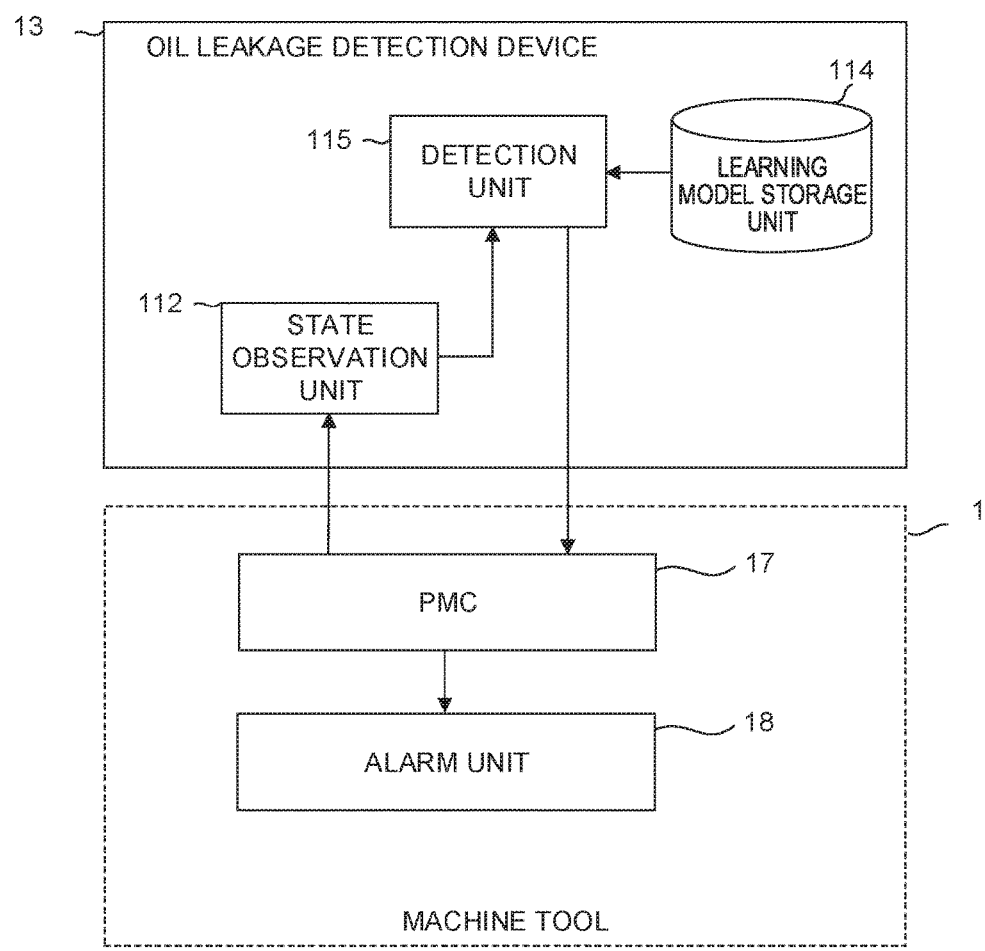
FIG. 8 is a schematic functional block diagram of the oil leakage detection device according to the one embodiment of the present invention at the time of oil leakage detection.
Figure 9:
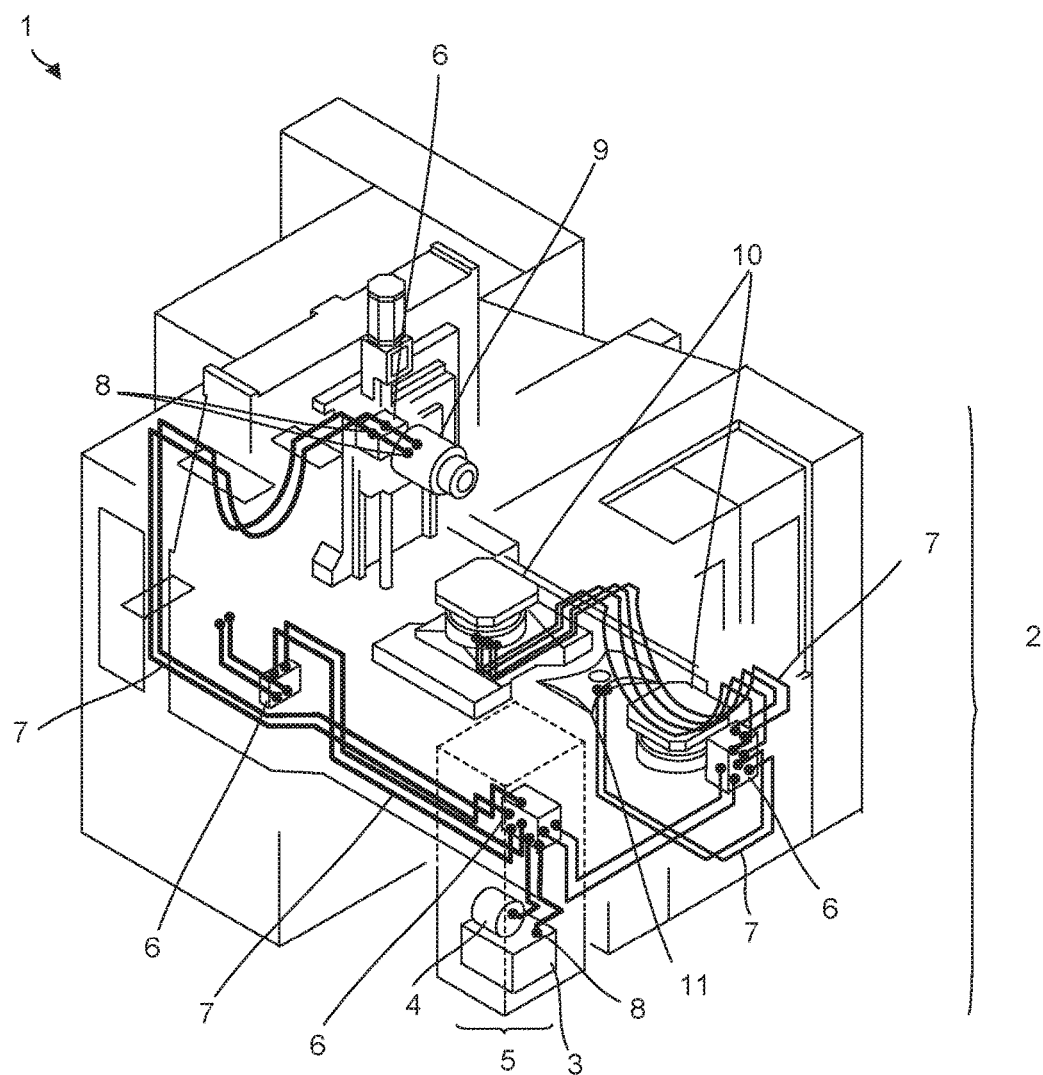
FIG. 9 is a view showing a schematic configuration of a hydraulic pressure supply device attached to a machine tool.

FIG. 8 is a schematic functional block diagram of the oil leakage detection device 13 according to the one embodiment of the present invention at the time of detection of the generation of oil leakage. The oil leakage detection device 13 of the present invention detects the generation of oil leakage in the hydraulic pressure supply device 2 of the machine tool 1, based on signals of the sensor 12 and the operating conditions of the drive units of the machine tool 1 acquired through a PMC (programmable machine controller) 17 of the machine tool 1 as an environment. On receiving signals input from in—and outside the machine tool 1, the PMC 17 processes these signals according to a sequence program and outputs them to processors in- and outside the machine tool 1. FIG. 8 shows only the PMC 17 and an alarm unit 18 as functional blocks of the machine tool 1. Actually, however, the machine tool 1 is provided with functional blocks shown in FIG. 1.

The oil leakage detection device 13 comprises the state observation unit 112, the learning model storage unit 114, and a detection unit 115.

The state observation unit 112 acquires the data used as the input data during the learning process described above through the PMC 17 while the operation of the machine tool 1 is being started, and creates input data based on the acquired information and outputs them to the detection unit 115. The state observation unit 112 creates change patterns of the oil flow rates by storing the oil leakage changes detected by the sensor 12 when the drive units of the machine tool 1 are activated in association with the individual drive units. Then, differences between the reference change pattern of the oil flow rate in the normal state and the created change patterns of the oil flow rates are output as input data to the detection unit 115.

Based on the input data input from the state observation unit 112, the detection unit 115 performs detection of the generation of oil leakage using the learning model stored in the learning model storage unit 114.

In this way, the detection unit 115 detects the generation of oil leakage based on the oil flow rate changes of the hydraulic pressure supply device 2 relative to the operating conditions of the drive units of the machine tool 1 and outputs detected values as the result of the detection to the PMC 17 of the machine tool 1. If the detected values for the generation of oil leakage input from the detection unit 115 are indicative of the generation of oil leakage, the PMC 17 commands the alarm unit 18 to generate an alarm.

When commanded to generate an alarm from the PMC 17, the alarm unit 18 notifies the operator of the generation of oil leakage and the point of the oil leakage generation by means of a lamp on the machine control panel (not shown) of the machine tool 1, display of a display device, a sound, or the like. The alarm unit 18 may be configured to command various parts of the machine tool 1 to stop their operations instead of generating an alarm.

Thus, the oil leakage detection device 13 can detect the generation of oil leakage during the operation of the machine tool 1 by using the learning model obtained as a result of learning based on information on oil leakage generated in at least one machine tool 1. If the oil leakage detection device 13 detects the generation of oil leakage, the machine tool 1, on receiving the result of the detection, gives an alarm to the operator to urge him/her to stop the operation of the machine tool 1 so that the occurrence of a malfunction or failure can be prevented.

While an embodiment of the present invention has been described herein, the invention is not limited to the above-described embodiment and may be suitably modified and embodied in various forms.

The above-described embodiment shows a form of learning and use for the single the oil leakage detection device 13. Since the learning model itself, which is constructed by the learning unit 111 and stored in the learning model storage unit 114, is a set of data indicative of the result of learning, however, it can be configured to be shared in common with another oil leakage detection device 13 by means of an external storage device (not shown), network, or the like. In the learning process, with this configuration, the time required for the completion of learning can be reduced in such a manner that a plurality of oil leakage detection devices 13 perform learning in parallel with one another with the single learning model shared by the oil leakage detection devices 13. For the use of the learning model, on the other hand, the shared learning model can be used to enable the individual oil leakage detection devices 13 to detect the generation of oil leakage. The method of sharing the learning model is not limited to a specific one. For example, the learning model may be previously stored in a host computer in a factory so that it can be shared by the oil leakage detection devices 13. Alternatively, the learning model may be previously stored on a server installed by a manufacturer so that it can be shared by the oil leakage detection devices 13 of customers.

Moreover, the configurations of the oil leakage detection device 13 for the learning and detection are described separately in connection with the above-described embodiment. Alternatively, however, the oil leakage detection device 13 may be simultaneously provided with the configurations for the learning and detection. In this case, the oil leakage detection device 13 can be configured so that the learning unit 111 performs additional learning based on the information input by the manager or maintenance personnel of the machine tool 1 as the generation of oil leakage is detected.

Furthermore, although the above-described embodiment shows an example in which the oil leakage detection device 13 is constructed separately from the machine tool 1, the oil leakage detection device 13 may alternatively be constructed as a part of a control device of the machine tool 1.

While an embodiment of the present invention has been described herein, the invention is not limited to the above-described embodiment and may be suitably modified and embodied in other forms.

The invention claimed is:

1. An oil leakage detection device for detecting oil leakage in a hydraulic pressure supply device which is configured to supply a hydraulic pressure to activate at least one driving mechanism of a machine tool, the oil leakage detection device comprising:
   a processor configured to
      from log data recorded during operation of the machine tool, acquire, as a change pattern, information on a change of a flow rate of oil supplied by the hydraulic pressure supply device corresponding to operating conditions of the driving mechanism,
      create input data based on the acquired change pattern,
      from the log data recorded during the operation of the machine tool, acquire information on a presence of oil leakage in the hydraulic pressure supply device and information on a point of oil leakage in the hydraulic pressure supply device,
      create teacher data based on the acquired information on the presence of oil leakage and the acquired information on the point of oil leakage in the hydraulic pressure supply device,
      perform supervised learning based on the created input data and the created teacher data,
      construct a learning model based on a result of the performed supervised learning, and
      store the constructed learning model in a storage device.

2. An oil leakage detection device for detecting oil leakage in a hydraulic pressure supply device which is configured to supply a hydraulic pressure to activate at least one driving mechanism of a machine tool, the oil leakage detection device comprising:
   a storage device configured to store a learning model constructed by supervised learning performed using (i) input data based on a change pattern indicative of information on a change of a flow rate of oil supplied by the hydraulic pressure supply device corresponding to operating conditions of the driving mechanism and (ii) teacher data based on information on a presence of oil leakage in the hydraulic pressure supply device and information on a point of oil leakage in the hydraulic pressure supply device; and
   a processor configured to
      create input data based on the change pattern indicative of the information on the change of the flow rate of oil supplied by the hydraulic pressure supply device corresponding to the operating conditions of the driving mechanism during operation of the machine tool, and
      detect the presence of oil leakage in the hydraulic pressure supply device and the point of oil leakage in the hydraulic pressure supply device from the created input data by using the learning model.

3. A machine tool, comprising:
   a controller configured to cause an alarm to be output in response to a detection, by the oil leakage detection device according to claim 2, of the presence of oil leakage in the hydraulic pressure supply device of the machine tool and the point of oil leakage in the hydraulic pressure supply device of the machine tool.

4. The machine tool according to claim 3, wherein the controller is configured to stop the operation of the machine tool in response to the detection, by the oil leakage detection device, of the presence of oil leakage in the hydraulic pressure supply device of the machine tool and the point of oil leakage in the hydraulic pressure supply device of the machine tool.

5. The machine tool according to claim 4, wherein the controller comprises the oil leakage detection device.

* * * * *